US005573865A

United States Patent [19]

Steelman et al.

[11] Patent Number: 5,573,865

[45] Date of Patent: Nov. 12, 1996

[54] GRAPHICS TRANSFER ARTICLE

[75] Inventors: Ronald S. Steelman, Woodbury; Loren R. Schreader, White Bear Lake, both of Minn.

[73] Assignee: Minnesota Mining and Manufacturing Company, St. Paul, Minn.

[21] Appl. No.: 449,212

[22] Filed: May 24, 1995

Related U.S. Application Data

[62] Division of Ser. No. 388,298, Feb. 14, 1995.

[51] Int. Cl.[6] .......... B32B 9/00

[52] U.S. Cl. .......... 428/40.9; 428/913.3; 428/200; 428/346; 428/352; 428/914; 428/41.8

[58] Field of Search .......... 428/42, 200, 346, 428/352, 913.3, 914

[56] References Cited

U.S. PATENT DOCUMENTS

| | | | |
|---|---|---|---|
| 3,065,120 | 11/1962 | Avelar | 154/46.8 |
| 3,276,933 | 10/1966 | Brant | 156/230 |
| 3,574,049 | 4/1971 | Sander | 161/220 |
| 3,708,320 | 1/1973 | Hurst et al. | 117/3.3 |
| 3,907,974 | 9/1975 | Smith | 428/346 |
| 3,928,710 | 12/1975 | Arnold et al. | 428/483 |
| 4,737,224 | 4/1988 | Fitzer et al. | 156/240 |
| 4,857,372 | 8/1989 | Ginkel et al. | 428/42 |
| 5,106,710 | 4/1992 | Wang et al. | 430/42 |
| 5,114,520 | 5/1992 | Wang, Jr. et al. | 156/240 |
| 5,262,259 | 11/1993 | Chou et al. | 430/47 |

FOREIGN PATENT DOCUMENTS

| | | | |
|---|---|---|---|
| 0 232 959 A2 | 8/1987 | European Pat. Off. | B44C 1/17 |

*Primary Examiner*—Patrick Ryan
*Assistant Examiner*—Cathy K. Lee
*Attorney, Agent, or Firm*—Gary L. Griswold; Walter N. Kirn; Carolyn V. Peters

[57] ABSTRACT

A graphics overlay composite comprising a premask layer and a protective layer, wherein the premask layer provides handleability and the protective layer provides environmental protection of an imaged composite once the premask layer is removed. Optionally, the protective layer is deformable under lamination conditions such that the graphics overlay composite can be laminated to an imaged receptor to provide a graphics transfer article or a graphics applique, either of which can be laminated to an atypical receptor to form an image composite.

6 Claims, 1 Drawing Sheet

GRAPHICS TRANSFER ARTICLE

This is a division of application No. 08/388,298 filed Feb. 14, 1995.

TECHNICAL FIELD

The invention relates to graphics transfer articles used to transfer graphics to a receptor, methods of transferring graphics from such composites onto a receptor, and the resultant imaged receptor.

BACKGROUND OF THE INVENTION

Early graphics transfer was achieved with wet transfer decals (see for example U.S. Pat. No. 3,065,120). Wet transfer decals use a release liner coated with a water-soluble composition to carry a transferable water-insoluble lacquer and/or ink image. The water-insoluble image is transferred from the release liner to a receptor by soaking the entire decal in water until the bonding strength of the water-soluble intermediate coating is weakened, removing the water-insoluble graphics from the release liner, and then pressing the removed image onto the receptor.

The use of wet transfer decals declined with the advent of pressure sensitive graphics transfer articles (see for example U.S. Pat. Nos. 3,065,120, 3,276,933, 3,574,049 and 3,708, 320). Heat curable graphics transfer articles have also been used for certain purposes. (See for example, U.S. Pat. Nos. 3,907,974 and 3,928,710).

While various methods of graphics transfer may work reasonably well for small graphics, larger sized graphics tend to present additional problems, one of which is application of such a larger sized graphic onto a substrate.

Enlarged reproductions of photographs are used extensively in the advertising and commercial graphics industries to produce photographic signage. These reproduced photographs are commonly mounted onto a sheet of structural material, such as polycarbonate, to display of the photograph. While such photographic displays provide a professional appearance, they tend to be expensive, bulky, subject to delamination of the picture from the structural material, subject to fading-(photographic dyes tend to fade with exposure to UV light), and limited to a display/of the exact subject matter shown in the photograph. In addition, the process requires capital-intensive equipment and is therefore practiced by a limited number of vendors.

Electrostatic printing of computer digitized photographs and other artwork is revolutionizing the manner in which the advertising and commercial graphics industries produce signage. A work of art, such as a photograph, is scanned to produce a digitized color reproduction. The digitized reproduction can be viewed on a video monitor and easily edited as desired. The digitized reproduction can be quickly and efficiently printed by use of an electrostatic color or ink jet printer. Such electrostatically-produced images may be printed directly onto the final imaging film or may be printed onto transfer media and then be transferred from the transfer media onto selected receptors, such as coated vinyl films, for eventual mounting of the imaged laminate onto a display surface, such as a billboard or the side of a semi-trailer. Such electrostatically-produced graphics may be quickly and easily, modified as desired and produce professional signage at a reasonable cost. The graphics-containing receptor can be rolled to facilitate transportation and storage. In addition, with the use of appropriate pressure sensitive adhesives, the mounted graphics are unlikely to peel or delaminate from the display surface.

Graphics intended for exterior display are frequently coated with a protective coating to shield the graphics from environmental damage, such as fading from exposure to ultraviolet light, delamination caused by moisture or humidity, scratching resulting from airborne particles, yellowing caused by pollutants, vandalism, etc. Clear coating has been found to be of significant benefit in increasing the useful life span of graphics and is widely used in the industry. Such protective coatings, commonly/referenced as "clear coats", can be applied by flood coating the finished graphics with a solvent-based solution of the clear coat polymer with evaporation of the solvent. However, solvent-based methods of applying a clear coat suffer several major drawbacks including significant time delays in the manufacture of graphics caused by the need to drive solvent from the clear coat solution, and the various environmental and workplace issues involved in the use and storage of potentially hazardous solvents.

Clear Coat Films

Clear, pressure sensitive films have been used to provide a protective clear coat. However, these films tend to be quite thick since are usually handled as free films. Furthermore, they are more expensive since they often require a special release liner, and they often require a premask to aid in application, which involves yet another manufacturing step. Efforts to further improve durability and/or production efficiency of graphics transfer articles and transfer techniques has focused upon the development of materials using water borne polymers or extended durability materials, but these all require additional manufacturing steps for the consumer.

Alternatively, a clear coat can be provided using the method described in U.S. Pat. No. 4,737,224, wherein the clear coat is a dry thermally transferable ink composition. The clear coat is transferred by placing the clear coat composition on a vacuum frame and evacuating substantially all of the air from an interface between the clear coat and a receptor. The pressure is maintained and the clear coat composition is heated sufficiently (typically in the range of 167° F. to 230° F.) to soften the clear coat composition and fuse the composition to the receptor.

Premasking Steps

After the graphics are produced by any imaging method, they are typically laminated with a "premask", which is usually a pressure sensitive adhesive coated paper. Ideally, this paper is translucent, for better visibility and low cost. The purpose of the premask is to enhance the rigidity of the graphic to facilitate application. Accordingly, a substantial need exists for a graphics transfer article and processing techniques that permits the transfer of commercially acceptable graphics from a graphics transfer article onto a wide range of receptor materials while reducing the use of volatile solvents used in the process and minimizing the number of steps required by the user.

SUMMARY OF THE INVENTION

Graphics Overlay

In one aspect of the present invention, a graphics overlay composite is provided comprising a premask layer and a protective layer. Such a graphics overlay composite permits the simultaneously adherence of both a protective layer (also referred to as a "durable clear coat") and a premask over an imaged film using conventional lamination equipment. Typically, the protective layer is nontacky at ambient temperatures. The protective layer may be a single layer as illustrated in the following Figures, or may be construed to include a multi-layered configuration, a multi-phase configuration, or a multi-component configuration.

Advantageously, the graphics overlay composite eliminates the use of hazardous solvents in applying the protective layer, as well as processing steps necessary to apply a separate clear coat and application tape (also known as "premask or prespace tape"). Furthermore, the lamination process can be completed in a matter of seconds as compared to long oven dry times or bake cycles necessary for conventional clear coats.

Graphics Transfer Article

In another aspect, a graphics transfer article is provided comprising an image printed on the outer surface of the protective layer of the graphics overlay composite. The strength of the interface bond between the protective layer and the premask layer should be sufficient to permit delamination of the premask layer from the protective layer under ambient conditions once the imaged protective layer have been adequately adhered to a suitable receptor.

The graphics transfer article may be manufactured by transferring an image (for example, an image produced from an electrostatic printer) from an originally imaged transfer sheet to the graphics overlay composite or printing directly with an inkjet. The transfer produces, for example, a graphics article comprising a premask layer/a protective layer/an image.

Graphics Appliqué

In yet another aspect, the graphics overlay composite may be used to fabricate a graphics appliqué by applying the graphics overlay composite to an imaged pressure sensitive receptor film. The image can be generated by any direct printing methods, such as screen printing, inkjet printing, thermal mass transfer and the like. A graphics appliqué of the present invention comprises a pressure-sensitive adhesive layer/a receptor substrate/an image/a protective layer/a premask layer.

Alternatively, the graphics appliqué may be fabricated by applying the graphics transfer article onto an imaged pressure-sensitive film. For example, the image can be transferred to the pressure-sensitive film by lamination techniques, such as the technique described in U.S. Pat. No. 5,106,710 and such description is incorporated herein by reference. Such application produces, for example, an article having in sequence pressure-sensitive adhesive layer/a receptor film/an image/a protective layer/a premask.

Imaged Composite

In still another aspect, a superior quality imaged receptor can be manufactured using the graphics transfer article when the receptor is an atypical receptor material, such as acrylic, polycarbonate, vinyl or metal. The atypical receptor can be imaged by applying the graphics transfer article to the atypical receptor using for example, headpressure lamination equipment with subsequent removal of the premask layer and adhesive from the laminated composite by peeling the premask layer from the protective layer.

DESCRIPTION OF THE PREFERRED EMBODIMENT(S)

Construction

Graphics Overlay

Referring to FIGS. 1 to 4, a graphics overlay composite (10) is illustrated comprising a premask layer (12) and a protective layer (14). Thus, the graphics overlay composite (10) permits the simultaneously adherence of both a protective layer (also referred to as a "durable clear coat") and a premask over an imaged film using conventional lamination equipment. Advantageously, the graphics overlay composite (10) eliminates the use of hazardous solvents in applying the protective layer, as well as processing steps necessary to apply a separate clear coat and application tape (also known as "premask tape").

Figure 1:
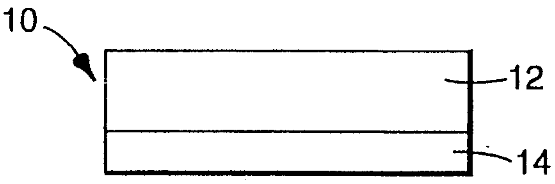
FIG. 1 is a side view a graphics overlay construction.

Although a single layer is depicted in the FIG. 1, it is within the scope of this invention that the protective layer (14) could be a multi-layered composite, a multi-phased layer, and/or a blend or thermoplastic materials and non-thermoplastic layers. For example, in the case of a multi-layered composite, the composite could be fabricated such that the composite functions as a protective layer, even though the individual layers do not provide the requisite protective features. Another example would be a multi-phase composite layer, wherein the layer comprises a thermoplastic that is treated such that the surface sequentially adjacent to the premask layer (12) is a durable, clear surface, while the outersurface of the protective layer (14) is deformable under lamination conditions. In all configurations of the present invention having a protective layer (14) with one or more layers or one or more phases, it is preferred that the durable clear coat layer be the layer or phase in closest proximity to the premask layer (12).

For example, a contemplated multi-layered composite could have a durable clear layer over a pressure sensitive adhesive layer, wherein the durable clear layer is between the premask layer and the pressure sensitive adhesive layer. Alternatively, there could a durable clear layer over a thermoplastic layer. It is also permissible and within the scope of the invention to provide a tie layer, barrier layer, or like between the premask layer and the thermoplastic layer or between layers within the graphic overlay composite (10) provided the multi-layered composite provides a transparent, protective layer. While it is not preferred, it is within the scope of the invention to have a graphics overlay composite (10) comprised of a premask layer (12) and a durable clear coat layer (14), wherein a thermoplastic layer is provided on subsequent articles and provides adhesion during any lamination process using the graphics overlay composite (10).

Premask Layer

The premask layer (12) provides rigidity to the thin film composites of this invention. Such an increased rigidity facilitates transportation, storage, and handling of the composites. The type of premask layer (12) chosen depends on the final application of the graphic composite. The premask layer (12) can be a single layer, or multi-layered. Multi-layered configurations could include a paper-coated polyethylene, a thermoplastic film with a releasable surface, either by the nature of the thermoplastic used or by applying a conventional release coating, polypropylene, polyethylene provided the adhesive bond strength between the interface of the premask layer (12) and the protective layer (14) permits handling up to the point of final application, but permits release once the final product is installed. Additionally, the premask layer (12) protects the surface of an imaged composite from abrasion and damage during application, that is, installation.

Application of the graphics appliques .and graphics transfer articles of this invention to contoured or non-planar surfaces, such as corrugation and rivets, requires that the composite be capable of controlled stretching in order to conform to the shape of the surface to which it is being applied without producing areas of excessive distortion. Generally, graphics composites stretched greater than about 10% result in perceptible distortion of the image unless distortion is perpendicular to the viewing plane.

In order to provide the desired controlled elongation, the premask layer should have a elastic modulus as measured by ASTM D882 of between 10,000 and 2,000,000 psi and preferably between 30,000 and 1,000,000 psi. Premask backings with an elastic modulus below 10,000 do not adequately reinforce the graphic being applied. Those with a higher modulus do not conform or are too brittle. The thickness of the premask backing is also a factor in ease of application and suitability of the premask backing for use as a premask. Premask backings that show utility can be elongated by the forces exerted during application. Similarly, a premask backing must be thick enough to provide adequate rigidity for application. Premask backings that show utility are between 0.001" and 0.015" in thickness and preferably between 0.002" and 0.010 inches. The modulus of the premask backing and/or the premask backing thickness can be adjusted to obtain the desired compliance of the premask backing. Non-rigid plastics and elastomer saturated papers work well for this application.

Elongation of the premask backing should be limited such that the marking is not visually distorted during application. Similarly, the backing should allow application over compound surfaces. The force required to elongate the backing is a function of the modulus of the backing and the caliper. The force required to elongate the backing ½% should be between 0.3 lbs and 52 lbs per inch width. Lower values provide easier application over compound surfaces and higher values provide easy application without visual distortion on flat surfaces.

Preferred premask layer materials are also transparent or translucent so that the graphics/image may be visually observed through the premask layer for pre-application identification and orientation.

Materials suitable for use as a premask in the composites of this invention, that is, those possessing the desired rigidity and tensile/elongation characteristics, include specifically, but not exclusively: polyethylene, biaxially oriented polypropylene, non-oriented polypropylene, polyester terephthalate, polyethylene coated paper such as 94# BL Poly Slik #8027 available from H. P. Smith, Chicago; acrylic saturated paper, such as IA 630-045 paper available from Monadnock.

Selected tensile and elongation characteristics for several of these materials is provided below in Table 1.

TABLE 1

Selected Premask Backings Properties

| Substrate | Manufacturer | Caliper | Modulus |
|---|---|---|---|
| Calendered White Vinyl | Kalex Plastics | 0.0039 | 3.68E+04 |
| Cast Clear Vinyl | 3M | 0.0019 | 7.49E+04 |
| Cast White Vinyl | 3M | 0.0018 | 7.56E+04 |
| Cast PP | Generic | 0.0035 | 1.22E+05 |
| Acrylic saturated paper | Monadnock | 0.0040 | 3.13E+05 |
| BOPP | Generic | 0.0020 | 3.40E+05 |
| Polyester | 3M | 0.0028 | 7.73E+05 |
| Poly coated paper | H. P. Smith | 0.0065 | 8.89E+05 |

Release Coating

Adhesion of the premask layer to the protective layer must be high enough to prevent premature delamination but low enough to permit removal of the premask layer from the composite after application to a receptor. In other words, the strength of the bond between the premask layer and the thermoplastic film must be substantially weaker than the bond strength between all other layers in the composite including the bond strength between the composite and the substrate to which the composite is mounted.

The strength of the bond between the premask layer and the thermoplastic film should be between about 50 to 700 grams/inch-width, preferably between about 100 to 400 grams/inch-width as measured with 180° peel (ASTM D-1000) at 12 inches per minute. A bonding strength of less than about 100 grams/inch-width tends to result in premature delamination of the premask layer from the thermoplastic film while a bonding strength of greater than about 400 lbs/inch-width typically requires excessive force to strip the premask layer from the thermoplastic film or tends to debond the pressure sensitive adhesive layer and thereby limits the types of materials available for the other layers of the composite.

The major surface of the premask layer in contact with the protective layer may optionally be coated with a release coating for purposes of reducing the bond strength between the premask layer and the protective layer. Materials suitable for use as a release coating are those capable of providing a bonding strength between the premask layer and the protective layer within the range established above. While selection of materials suitable for use as a release coating depends upon several factors including the specific materials from which the premask layer and protective layer are constructed, materials generally found to be suitable as an effective release coating for a wide range of thermoplastic materials or materials having thermoplastic-like qualities include specifically, but not exclusively, silicone-based materials such as polydimethyl siloxane, organic silanes; and low surface energy olefins such as ethylene acrylic acid, polyethylene, polypropylene, waxes, tetrafluoroethylene fluorocarbon polymers (TFE), fluorinated ethylene-propylene (FEP) polymers, and copolymers of TRE & FEP.

Protective Layer

The protective layer (14) of the graphics overlay composite (10) can provide a number of outermost surface features, such as asthetics and/or durability. The surface (13) of the protective layer (14), that is exposed once the premask layer (12) is removed after final application, is typically a harder, durable surface at service temperatures and is referred to hereinafter as the "hard coat surface". "Service temperature" is defined as the temperature or temperatures which the final product is subjected to, for example, the service temperature for a graphic on the side of a vehicle can range from below zero (Alaska weather conditions) to above 150° F. or higher temperatures (Arizona desert conditions).

Particularly useful surface features include, but are not limited to (1) gloss or matte control; (2) solvent resistance; (3) UV resistance; (4) durability (wearable, weatherability); and (5) abrasive resistance.

In a preferred embodiment, the protective layer (14) has a hard coat surface (13) and a surface (15), that is the one farthermost away from the premask layer (12) that is a deformable or flowable adhesive surface and can be referred to as the "soft coat surface". The soft coat surface is deformable or flowable below lamination conditions. It is contemplated that such a protective layer (14) can be a single layer having both of the desired characteristics, that is a single layer wherein one surface is a hard coat surface and the other surface is a soft coat surface. Alternatively, the protective layer (14) can be multi-layered or multi-phased, as discussed below.

Soft Coat Component (Adhesive Component)

The soft coat surface is a layer or portion of the protective layer in the graphics overlay composite that bonds to an imaged receptor to form a graphics appliqué for typical surfaces. Such a layer can be a thermoplastic film and is also the layer of the graphics transfer article that lifts a colored image from an originally printed transfer sheet or functions as the receptor layer for an inkjet image and then bonds to a receptor to form a graphics appliqué for typical surfaces. As a result, the thermoplastic film should firmly adhere to both the image and receptors.

Thermoplastic film possessing the necessary bonding characteristics with colorants and receptors are generally those with a softening or deformable point of between about −112° F. to 240° F. Thermoplastics with a softening point of less than about 90° F. tend to be soft materials at room temperature, such a pressure sensitive adhesive compositions. They are easier to laminate, however, they are also more susceptible to abrasion and other damage than harder materials, unless they are post crosslinked, such as with UV light, e-beam, thermal, etc. Thermoplastics with a softening point of greater than about 250° F. tend to damage the colorant and/or receptor due to the excessively high temperatures required to achieve bonding.

Useful thermoplastics include specifically, but not exclusively: acrylic copolymers or homopolymers containing materials, such as, methyl methacrylate, ethyl methacrylate, butyl methacrylate, ethylene methacrylic acid, ethylene acrylic acid, acrylic acid, ethyl acrylate, methyl acrylate, butyl acrylate, iso-octyl acrylate, 2-ethylhexyl acrylate; polyurethane polymers and copolymers; vinyl copolymers such as vinyl chloride/vinyl acetate copolymers; waxes; urethane/acrylate copolymers.

Hard Coat Component

As stated above, the protective layer protects underlying graphics (images) from various environmental conditions. The protective layer provides one more of (i) gloss or appearance control, (ii) solvent resistance, (iii) water resistance, (iv) ultra violet light resistance, (v) oxidation resistance, and (vi) abrasion resistance. When the protective layer, or at least one portion of the layer is a thermoplastic material, the thermoplastic material preferably is capable of lifting toner from an originally printed transfer sheet.

A wide variety of protective materials are well-known in the industry and include specifically, but by no means exclusively: acrylic, vinyl, cellulose, urethane, fluoropolymers and alkyds.

Materials capable of providing both the graphics transfer function and the protective function include thermoplastics with a softening point of about 110° to 240° F. that harden under ambient conditions to form a hard, non-tacky solid. Useful thermoplastics or materials having thermoplastic-like properties include specifically, but not exclusively: acrylic copolymers or homopolymers containing materials, such as, methyl methacrylate, ethyl methacrylate, butyl methacrylate, ethylene methacrylic acid, ethylene acrylic acid, acrylic acid, ethyl acrylate, methyl acrylate, butyl acrylate; polyurethanes polymers and copolymers; acrylic/polyurethane thermoplastic copolymers, vinyl copolymers, such as vinyl chloride/vinyl acetate copolymers; waxes; urethane/acrylate copolymers.

Alternatively a separate hard coat layer may be provided (also referred to as durable clear layer) which provides the protective function. Use of such separate layers permits any of the well-known protective layers to be employed without regard to compatibility of the material with printing inks or toners or melt points. The sequence of such a composite would be a premask layer/a protective layer/thermoplastic film. If necessary, a mutually compatible film ("tie layer") could be employed between the protective layer and the thermoplastic film to ensure complete compliance of these two layers. It is also permissible to include a tie or release layer between the premask layer and the protective layer.

Multi-Phased Protective Layer

In yet another alternative, the protective layer could be a single layer, that because of its composition or subsequent treatment would form a single layer having more than one phase, although there may or may not be a discernible interface. An advantage of such a layer could include processing efficiency, raw material conservation and the like. Such multi-phase single layer compositions could include, for example, partially compatible and/or incompatible polymers or copolymers, wherein the polymers or copolymers would have a tendency to migrate to one side of the layer, thus providing both major surfaces with different characteristics. In a similar fashion, a blend of a material having different molecular weights could also be used to provide different surface characteristics.

An alternative to partially compatible and/or incompatible polymers is to treat the surface of a single layer is such a way as to affect a different surface characteristic. Such treatment could include, for example, radiation treatment, surface grafting, and the like.

Graphics Transfer Article

Figure 2A:
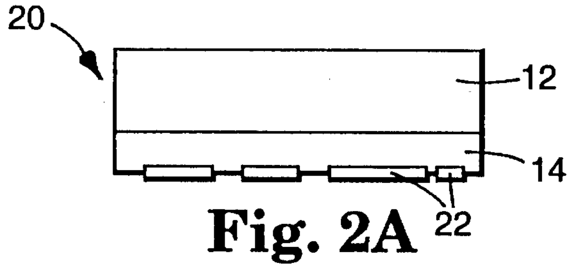
FIG. 2*a* is a side view of a graphic transfer article.

Referring to FIG. 2*a*, a graphics transfer article (20) is illustrated and comprises the graphics overlay composite (10) of FIG. 1 wherein there is an image (22) on a first side (the soft adhesive side). The strength of the interface bond between the protective layer (14) and the premask layer (12) is effective for permitting delamination of the premask layer (12) from the protective layer (14) under ambient conditions once the printed protective layer has been adequately adhered to a suitable receptor. The image (22) may be provided either by directly printing the image on the graphics overlay composite (10), for example using ink jet printers or by transferring a toner image from an originally imaged transfer sheet to the graphics overlay composite, for example using a Scotchprint™ Electronic Graphics System (available from 3M). This transfer produces a graphics transfer article (20) having at least one premask layer (12), one thermoplastic protective layer (14) and one image layer (22).

Graphics

Graphics images may be printed from any of the well-known colorants including dyes, inks, paints, pigments, and toners. Selection of the colorant depends upon several factors including the type of material to be printed and the intended use of the graphics article and method of imaging. There are several sources of colorants useful in the manufacture of the composites of this invention including 3M, such as 3900, 6600 and 7000 Series screen printing inks, and 8700 Series toners.

The colorant may be applied to a transfer sheet or directly upon the image receptor film of the graphics transfer articles of this invention by any of the well-known printing or graphics transfer methods including electrostatic printing, gravure printing, offset printing, paint-on-paper, screen printing, ink jet printing, etc.

Electrostatic Toner

A particularly useful colorant is electrostatic toner. Briefly, electrostatic toner is a collection of colored particles having an associated electrical charge. The toner is available as a free flowing powder or a liquid dispersion. Graphics are printed by electrically charging an image upon the surface to be printed and then bringing the latent image into contact with the electrostatic toner. The colored particles adhere only to those areas on the surface which carry an electrical charged which is opposite to the charge on the toner. In some equipment, the toner is immediately transferred from the printed surface to the material that is being imaged and the printed surface is reused with each image.

Imaged Composite

Figure 2B:
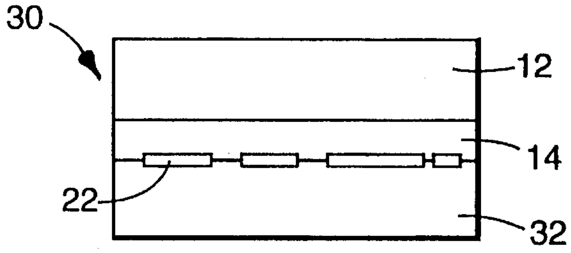
FIG. 2*b* is a side view of a laminated graphics overlay onto an atypical receptor.

Referring to FIG. 2*b*, an imaged receptor (30) can be manufactured using a graphics transfer article (20) when the receptor (32) is an atypical receptor material, such as acrylic, polycarbonate, vinyl or metal. The atypical receptor (32) can be imaged by applying the graphics transfer article (20) to the atypical receptor (32) using for example, heat/pressure lamination equipment with subsequent removal of the premask layer (12) from the laminated composite by peeling the premask layer (12) from the protective layer (14).

Receptor

The atypical receptor (32) may be any of the well known structural materials used to support and display graphics. Several broad categories of receptors may be used and include rigid plastics such as methacrylates and polycarbonates; flexible plastics such as vinyl; metals such as aluminum and steel; olefins such as polypropylene film; fiberglass; and glass.

When an image is prepared using an ink jet printer, many receptors must be coated with a top layer in order to obtain a commercially acceptable image on the receptor. Most often, material that can be successfully imaged with an inkjet printer is coated with a layer that absorbs the ink, prevents the ink from bleeding, and protecting the image from abrasion. This layer is usually very hydroscopic and is not considered durable. Furthermore, the base material that is coated with this ink receptor layer is subject to the requirements normally imposed on sheet coating operations. Namely, the material should be thin and flexible to allow transport through a typical web coater. It is not usually feasible to coat an individual sheet with some type batch process. Therefore, coating of thick acrylic, polycarbonate, vinyl, and metal is usually not done.

When imaged using electrostatically applied toner or a layer capable of receiving an electrostatic charge many receptors must be coated with a top layer in order to obtain a commercially acceptable image on the receptor.

The charge receptor layer has very critical properties and must be conducted under highly controlled conditions. This is usually done by web coating on a coater capable of maintaining exact coating weights. Again, thick materials are not conducive to web coating. However, thick materials, particularly acrylic, polycarbonate, vinyl, and metal are preferred receptor materials for commercial signage.

Those receptor materials that produce commercially unacceptable images when imaged directly with an electrostatic toner or printed directly with an ink jet printer are referenced as "atypical receptors" and include all of the aforementioned receptor materials without a specific top layer for image receptivity. It is noted that vinyl materials produce a slightly better, but still unacceptable, transfer of such toner images.

Improved Toner Receptors

Electrostatic toners can be transferred to polymeric films such as vinyl with limited success. The heat resistance of the film, necessary for normally application and handling characteristics on warm days, prevents the film from softening adequately to bond to the toners. Furthermore, toners have very low internal bond strength and have a limited amount of thermoplastic binder necessary to firmly bond the toner to the receptor. Assignee's U.S. Pat. No. 5,106,710 describes the characteristics of coatings on receptor sheets that will enhance the transfer and adhesion of toners.

Graphics Appliqué

Figure 3:
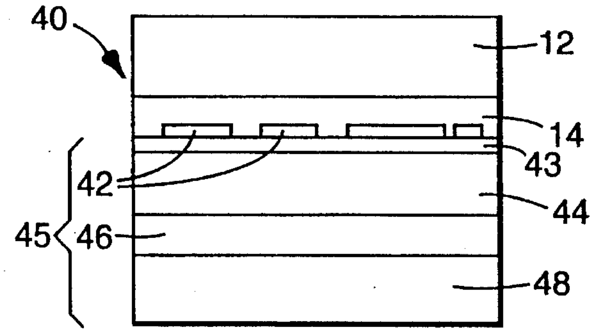
FIG. 3 is a side view of a graphics appliqué construction.

Referring to FIG. 3 the graphics overlay composite (10) may be used to fabricate a graphics appliqué (40) by applying the graphics overlay composite (10) to an imaged pressure sensitive receptor film (45) comprising an image (42) on a flexible film (44) having a layer of pressure sensitive adhesive (46) backed with a release liner (48). In some configurations, there is an image receptor layer (43) present, although this should be construed as a limiting feature.

Alternatively, the graphics appliqué (40) may be fabricated by applying a graphics transfer article (20) onto a pressure-sensitive film (44, 46,48, optionally 43). Such application produces an article comprising a release liner (48), a pressure-sensitive adhesive layer (46), a flexible film (44), an image (42), a protective layer (14), and a premask layer (12).

Imaged Composite

Figure 4:
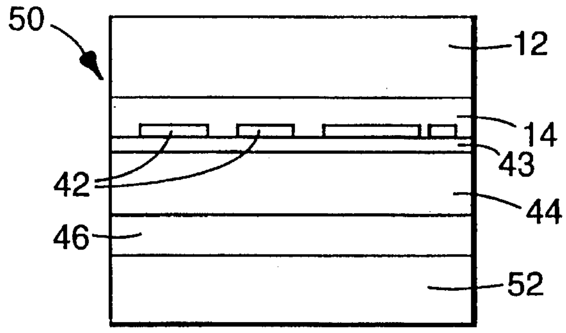
FIG. 4 is a side view of a laminated graphics appliqué onto a typical receptor.

Referring to FIG. 4, the graphics appliqué (40) can be applied to a receptor (52) to provide an imaged composite (50). Receptor (52) may be any of the well known structural materials used to support and display graphics. Several broad categories of receptors may be used and include rigid plastics such as acrylates and polycarbonates; flexible plastics such as vinyl; metals such as aluminum and steel; fiberglass; and glass.

Process of Manufacture

Graphics Overlay

The graphics overlay may be conveniently manufactured by depositing a thin coating of the thermoplastic or protective layer onto the premask layer and then curing (or hardening) the coating. The coating may be cured (hardened) by any of several possible techniques dependent upon the type of coating system employed including cooling, solvent or vehicle evaporation and/or irradiation. The thermoplastic and/or protective layers may be deposited onto the premask by any of the well known thin film application techniques including extrusion, solvent-based flood coating, casting, printing, spraying, etc. Coating thicknesses are typically in the range of 0.0002 to 0.004 inches dry.

Alternatively, the thermoplastic layer can be a free standing film laminated to a premask layer.

Graphics Transfer Article

The graphics transfer article is conveniently manufactured by either (i) transferring colorant or an image from an originally printed transfer sheet to the graphics overlay using standard lamination techniques such as heated nip rollers, or (ii) directly imaging the thermoplastic film of the graphics overlay. The first process is preferred for imaging the graphics overlay with electrostatically applied toner images or with a paint-on-paper design while the second process is preferred for imaging the graphics overlay with a silk screen printing or ink jet printing methods. If screen printing or another printing method is used, the thermoplastic layer or portion of the protective layer must be able to compensate for the limited adhesion and/or cohesion properties of the image. Alternatively, a thermoplastic of soft layer can be on the receptor.

Graphics Appliqué

The graphics appliqué may be manufactured by laminating the graphics overlay or graphics transfer article to a pressure-sensitive film. Such lamination produces sequentially laminated layers of pressure-sensitive adhesive/receptor/image/thermoplastic film/premask. Again, the lamination may be effected using standard lamination equipment such as heated nip rollers.

Imaged Composite

A superior quality imaged atypical receptor can be manufactured by simply laminating the graphics transfer article directly to the atypical receptor using standard lamination equipment and then peeling the premask from the laminated composite.

The temperature and pressure exerted upon the various composites by the nip rollers will vary dependent upon the specific thermoplastic material in the graphics appliqué, receptor material, colorant being used, and the roller type and position within the laminator. The atypical receptor is usually rigid such that a bottom rubber roller in the laminator has very little effect on increasing the pressure area or the time in the laminator nip. Similarly, a top steel roller is in contact with a semi-rigid material. This results in very high pressures and short dwell times. Alternatively, a heated top rubber roller may be used. Under these conditions, the dwell time is increased, the compliance of the roller to the semi-rigid receptor is increased, and the actual pressure in pounds per square inch is decreased. Either of these conditions can produce acceptable results. Generally a pressure of about 30 to 100 pounds per lineal inch and a temperature of about 180° F. to 250° F. with a speed of between 1 and 3 feet per minute will be effective for achieving the desired bonding. Spacers may be included in the laminator to maintain a minimum laminator opening. Higher pressure, temperatures or dwell times will generally improve transfer of the image.

Application of Graphics Appliqué

The graphics appliqué is applied to a suitable surface by (i) removing the release liner to expose the pressure sensitive adhesive coated onto the imaged film receptor, (ii) positioning the appliqué over the surface to be decorated and pressing one corner or an edge of the appliqué into adhesive engagement with the surface, (iii) firmly pressing the remainder of the appliqué into adhesive engagement with the surface to be decorated with smooth strokes beginning from the initially bonded corner or edge, and (iv) peeling the premask from the applied appliqué. A plastic squeegee or similar tool can be used to aid adhesive bonding of the appliqué in step (iii) and remove any air-bubbles.

Objects and advantages of this invention are further illustrated by the following examples, but the particular materials and amounts thereof recited in these example, as well as the conditions and details, should not be construed to unduly limit this invention. All materials are commercially available or known to those skilled in the art except where stated or otherwise apparent.

Lamination Method and Apparatus

Laminators generally consist of a hard (steel) roll and a softer (rubber) roll, or in some cases two softer rolls. The metal rolls are preferred because they can transfer heat more efficiently and can supply higher pressures without creating excessive wrinkles. The actual transfer pressure and dwell time is dependent primarily on the actual roll pressure and the through put speed. However, these factors are also controlled by the roll hardness. As nip pressure increases, soft rolls deform and distribute the pressure over a wider area. Therefore, the actual pressure does not increase as rapidly as the overall load pressure (typically measured by the hydraulic pressure), and the dwell time in the gap increases proportionally to the contact area. For a laminator with 9" diameter steel roll, a 58 Shore D durometer rubber roll, 5 inch diameter air cylinders, and a 45" width, the following equations were derived by experimentation and serve only as an example:

$$\text{Footprint width (inches)} = 0.005 * \text{pressure} + 0.618$$

$$\text{Dwell time (seconds)} = \frac{\text{Footprint width} * 60}{\text{Speed (inches/min)}}$$

$$\text{Actual Pressure} = 0.78 * \text{pressure} + 7.8$$

(Intercepts are not zero because of the weight of the steel roll.)

EXAMPLES

The following Examples set forth exemplar procedures for the invention, which is clearly set forth above and the procedures, with the selection of the appropriate reagents is believed to be able to enable the synthesis of the generic class of compounds described herein above and recited in the claims that follow this description.

EXAMPLE 1

Release Coated Premask

Ethylene acrylic acid, obtained from Dow Chemical, was extruded onto a 2 mil oriented polyester carrier sheet and cooled to form a 2 mil ethylene acrylic acid film on the carrier sheet.

A sheet of 43 lbs per 3000 sq. ft, IA 630-045 paper (an acrylic saturated base paper available from Monadnock) was laminated to the ethylene acrylic acid film on the carrier sheet by passing the overlapped composite through a heated nip roller at a pressure of 60 psi, a temperature of 205° F. and a dwell time of 3 seconds. The ethylene acrylic acid film softened in the nip roller and bonded to the Mondanock IA 630-045™ paper. The polyester carrier sheet was then stripped away to form a release coated premask. A similar material could be made by extruding the ethylene acrylic acid directly onto the paper.

EXAMPLE 2

Graphics Overlay

Into a glass bottle was placed 100 grams R-9000™ (an acrylic/polyurethane copolymer latex obtained from Zeneca Resins US of Wilmington, Mass.), 100 grams R-9013™ (an acrylic/polyurethane copolymer latex obtained from Zeneca Resins US of Wilmington, Mass.), and 20 grams Texanol (Eastman Chemical) co-solvent as a coalescing agent to form a first mixture. The first mixture was agitated for about 5 minutes until uniform and then notch bar coated, with a notch bar having a gap over the coating surface of 0.004 inches, onto a premask formed in accordance with the procedure of Example 1. The coated premask was dried in a convection oven at a temperature of 180° F. for 5 minutes to form a graphics overlay having a 1 mil thick thermoplastic film coated on the ethylene acrylic acid release layer of the premask.

EXAMPLE 3

Graphics Overlay

Into a glass bottle was placed 30 grams XK-90™ (an acrylate latex obtained from Zeneca Resins US of Wilmington, Mass.), and 30 grams A-1052™ (an acrylate latex obtained from Zeneca Resins US of Wilmington, Mass.) to form a first mixture. The first mixture was agitated for about 5 minutes until uniform and then notch bar coated, with a notch bar having a gap over coating surface of 0.004 inches, onto a 3.5 mil thick cast polypropylene premask. The coated premask was dried in a convection oven at a temperature of 180° F. to form a graphics overlay having a 1 mil thick thermoplastic film coated on the premask backing.

EXAMPLE 4

Graphics Overlay

Into a vessel equipped with mechanical stirrer was placed 96.72 lbs Acryloid™ B-84 (a 40% methyl methacrylate copolymer resin solution in toluene obtained from Rohm & Haas), and 3.28 lbs Santicizer™ 160 (a butyl benzyl phthalate obtained from Monsanto) to form a first mixture. The mixture was agitated for about 10 minutes until uniform and then notch bar coated, with a notch bar having a gap setting of 0.005 inches, onto a 2 mil thick biaxially oriented polypropylene premask. The coated premask was dried in a ventilated oven at a temperature of 150° F. for 10 minutes to form a graphics overlay having a 1 mil thick non-tacky thermoplastic film laminated to the premask.

EXAMPLE 5

Graphics Overlay

Into a vessel equipped with mechanical stirrer was placed 100 lbs Acryloid™ B-84 (a 40% methyl methacrylate copolymer resin solution in toluene obtained from Rohm & Haas), 50 lbs methyl ethyl ketone (MEK), 7.94 lbs 1,6-hexanediol diacrylate obtained from Sartomer resins, and 0.53 lbs Irgacure™ 651 (a photoinitiator obtained from Ciba Geigy) to form a first mixture. The first mixture was agitated for about 15 minutes until uniform and then notch bar coated, with a notch bar having a gap setting of 0.005 inches, onto a 2 mil thick corona treated biaxially oriented polyester premask. The coated premask was dried in a ventilated oven at a temperature of 150° F. for 10 minutes to form a graphics overlay having a 1 mil thick slightly tacky thermoplastic film laminated to the premask. The thermoplastic film could be easily marred with a finger nail.

EXAMPLE 6

Graphics Overlay

Into a vessel equipped with mechanical stirrer was placed 70 lbs UCAR™ 882 (a reactive acrylate system obtained from Union Carbide), 30 lbs UCAR™ 883 (a reactive acrylate system obtained from Union Carbide), and 6.5 lbs UCAR™ 888 (a reactive acrylate system obtained from Union Carbide) to form a first mixture. The first mixture was agitated for about 10 minutes until uniform and then notch bar coated, with a notch bar having a gap setting of 0.002 inches, onto a 3.5 mil thick cast polypropylene premask. The coated premask was dried in a ventilated oven at a temperature of 150° F. for 2 minutes to evaporate the solvent but without completely crosslinking the acrylate. The resultant film of the first mixture was 0.7 mils thick.

Into a second vessel equipped with mechanical stirrer was placed 100 lbs Acryloid™ B-84 (a 40% methyl methacrylate copolymer resin solution in toluene obtained from Rohm & Haas), 3.39 lbs Santicizer™ 160 (a butyl benzyl phthalate obtained from Monsanto), and 50 lbs MEK to form a second mixture. The second mixture was agitated for about 10 minutes until uniform and then notch bar coated, with a notch bar having a gap setting of 0.003 inches, over the first film on the polypropylene premask. The twice coated premask was dried in a ventilated oven at a temperature of 150° F. for 10 minutes to evaporate solvent from the second mixture. The resultant film of the second mixture was 0.7 mils thick. The composite was allowed to cure under ambient conditions for 1 week resulting in sequential layers of premask/crosslinked polymer/thermoplastic polymer.

EXAMPLE 7

Graphics Overlay

An ethylene acrylic acid coated polyester premask was formed in accordance with the procedure of Example 1 except that 3.6 parts of a weathering stabilizer system, consisting of 2.0 parts UV absorber, 1.5 hindered amine light stabilizer, and 0.1 parts anti-oxidant was included in the ethylene acrylic acid.

A 15% solids solution of Elvax™150, obtained from Dupont Polymer Products, was notch bar coated, with a notch bar having a gap setting of 0.005 inches, onto the ethylene acrylic acid film. The Elvax™ coated premask was dried in a convection oven at a temperature of 150° F. to form a graphics overlay having a 0.4 mil thick thermoplastic film laminated to the ethylene acrylic acid layer on the polyester premask.

EXAMPLE 8

Graphics Overlay

Into a vessel equipped with mechanical stirrer was placed 100 lbs Acryloid™ B-84 (a 40% methyl methacrylate copolymer resin solution in toluene obtained from Rohm & Haas), 50 lbs MEK, and 5 lbs Piccolastic D-125 (a terpene tackler resin obtained from Hercules, Inc., Resins Group), to form a first mixture. The first mixture was agitated for about 30 minutes until uniform and then coated, with a notch bar having a gap setting of 0.005 inches, onto a 3 mil thick polyester premask.

EXAMPLE 9

Graphics Applique

The graphics overlay of Example 2 was heat laminated to a screen printed pressure sensitive vinyl film. The imaged vinyl film included sequential layers of image/vinyl/pressure sensitive adhesive/release liner. The overlapped composite was passed through 45" wide heated nip rollers [one steel and one 58 Shore D hardness rubber] operating under a total pressure of 55 lbs per lineal inch with the steel roller heated to a temperature of 205° F. The composite was feed through the nip at a speed of 1.5 ft/min resulting in a dwell time of 3.13 seconds. The thermoplastic film softened in the nip roller and bonded to the screen printed image and the softened vinyl film. The resultant graphics appliqué included the sequential bonded layers of premask/release coating/thermoplastic film/image/vinyl/pressure sensitive adhesive/release liner.

The graphics appliqué, after removal of the premask and release liner, was tested in accordance with ASTM D882, and the tensile strength and elongation to break were found to be comparable to the tensile strength and elongation to break of the uncoated screen printed pressure sensitive vinyl film after removal of the release liner. The clear coat adhesion was tested according to ASTM D 3359 and received a perfect 5A rating.

EXAMPLE 10

Graphics Applique

The graphics overlay of Example 3 was heat laminated to a screen printed pressure sensitive vinyl film. The imaged vinyl film included sequential layers of image/vinyl/pressure sensitive adhesive/release liner. The overlapped composite was passed through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The thermoplastic film softened in the nip roller and bonded to the screen printed image and the base vinyl film. The resultant graphics appliqué included the sequential bonded layers of premask/thermoplastic film/image/vinyl/pressure sensitive adhesive/release liner.

Removal of the polypropylene premask revealed a high gloss finish on the thermoplastic film mirroring the finish on the polypropylene premask.

EXAMPLE 11

Graphics Applique

The graphics overlay of Example 4 was heat laminated to screen printed pressure sensitive vinyl films. One pressure sensitive vinyl film had been printed with 3M 3900™ Series screen printing ink (predominately polyvinyl chloride copolymer) and the other film was printed with 3M 6600™ Series screen printing ink (predominately acrylic). The imaged vinyl film included sequential layers of image/vinyl/pressure sensitive adhesive/release liner. The overlapped composite was passed through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The thermoplastic film softened in the nip roller and bonded to the screen printed image and the base vinyl film. The resultant graphics appliqué included the sequential bonded layers of premask/thermoplastic film/image/vinyl/pressure sensitive adhesive/release liner.

EXAMPLE 12

Graphics Applique

The graphics overlay of Example 4 was heat laminated to a receptor coated pressure sensitive vinyl film that had been previously imaged by heat transferring electrostatic toner from originally printed transfer paper in accordance with the process disclosed in U.S. Pat. No. 5,106,710. The imaged vinyl film included sequential layers of toner image/vinyl/pressure sensitive adhesive/release liner. The overlapped composite was passed through heated nip rollers [one steel and one 58 Shore D hardness rubbed at a pressure of 55 lbs per lineal inch with the steel roller heated to a temperature of 205° F. The composite was feed through the nip at a speed of 1.5 ft/min resulting in a dwell time of 3.13 seconds. The thermoplastic film softened in the nip roller and bonded to the screen printed image and the base vinyl film. The resultant graphics appliqué included the sequential bonded layers of premask/thermoplastic film/toner image/vinyl/pressure sensitive adhesive/release liner.

EXAMPLE 13

Graphics Applique

The graphics overlay of Example 5 was heat laminated to a screen printed pressure sensitive vinyl film. One pressure sensitive vinyl film had been printed with 3M 3900™ Series screen printing ink (predominately polyvinyl chloride copolymer) and the other film was printed with 3M 6600™ Series screen printing ink (predominately acrylic). The imaged vinyl film included sequential layers of image/vinyl/pressure sensitive adhesive/release liner. The overlapped composite was passed through heated nip rollers [one steel and one 58 Shore D hardness rubber] at a pressure of 55 lbs per lineal inch with [the steel roller heated to a temperature of 205° F. The composite was feed through the nip at a speed of 1.5 ft/min resulting in a dwell time of 3.13 seconds. The thermoplastic film bonded to the screen printed image and the base vinyl film. The resultant graphics appliqué included the sequential bonded layers of premask/thermoplastic film/image/vinyl/pressure sensitive adhesive/release liner. The appliqué was continuously exposed to normal fluorescent lighting for two days after which the premask was removed and the thermoplastic film was observed to be hard and resistant to scratching.

EXAMPLE 14

Graphics Applique

The graphics overlay of Example 6 was heat laminated to a receptor coated pressure sensitive vinyl film that had been previously imaged by heat transferring electrostatic toner from originally printed transfer paper in accordance with the process disclosed in U.S. Pat. No. 5,106,710. The imaged vinyl film included sequential layers of toner image/vinyl/pressure sensitive adhesive/release liner. The overlapped composite was passed through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The dual layer thermoplastic film softened in the nip roller and bonded to the toner image and the base vinyl film. The resultant graphics appliqué included the sequential bonded layers of premask/crosslinked film/thermoplastic film/toner image/vinyl/pressure sensitive adhesive/release liner.

EXAMPLE 15

Graphics Applique

The graphics overlay of Example 6 was heat laminated to a screen printed pressure sensitive vinyl film. The pressure sensitive vinyl film had been printed with 3M 3900™ Series screen printing ink (predominately polyvinyl chloride based ink) and 3M 6600™ Series screen printing ink (predominately acrylic based ink). The imaged vinyl film included sequential layers of image/vinyl/pressure sensitive adhesive/release liner. The overlapped composite was passed through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The thermoplastic film bonded to the screen printed image and the base vinyl film. The resultant graphics appliqué included the sequential bonded layers of premask/crosslinked film/thermoplastic film/image/vinyl/pressure sensitive adhesive/release liner. The premask was removed and the thermoplastic film found to be hard and resistant to scratching.

EXAMPLE 16

Graphics Applique

The graphics overlay of Example 7 was heat laminated to a receptor coated pressure sensitive vinyl film. The pressure sensitive vinyl film had been previously imaged by heat transferring electrostatic toner from originally printed transfer paper in accordance with the process disclosed in U.S. Pat. No. 5,106,710. The imaged vinyl film included sequential layers of toner image/vinyl/pressure sensitive adhesive/release liner. The overlapped composite was passed through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The thermoplastic film softened in the nip roller and bonded to the toner and the base vinyl film. The resultant graphics appliqué included the sequential bonded layers of premask/protective coating/adhesive layer/toner image/vinyl/pressure sensitive adhesive/release liner.

EXAMPLE 17

Graphics Applique

The graphics overlay of Example 7 was heat laminated to a screen printed pressure sensitive vinyl film. One pressure sensitive vinyl film had been printed with 3M 3900™ Series screen printing ink (predominately polyvinyl chloride copolymer) and the other film was printed with 3M 6600™ Series screen printing ink (predominately acrylic). The imaged vinyl film included sequential layers of image/vinyl/pressure sensitive adhesive/release liner. The overlapped composite was passed through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The thermoplastic film bonded to the screen printed image and the base vinyl film. The resultant graphics appliqué included the sequential bonded layers of premask/protective layer/tie layer/image/vinyl/pressure sensitive adhesive/release liner.

EXAMPLE 18

Ink Jet Graphics

The following solution was prepared: 95 grams of deionized water and 5 grams Polyox™ N-3000 (available from Union Carbide).

The solution was coated using a notched bar with a gap setting of 0.004 inches onto a 3 mil polyester and dried at 250° F. for 5 minutes. The dried sheet material was imaged using a Hewlett Packard Desk Jet Plus printer containing a standard HP ink cartridge. Visual inspection indicated an image of good quality and density was obtained.

The imaged sheet was heat laminated to Controltac™ vinyl film series 180-10 through heated nip rollers [one steel and one 58 Shore D hardness rubber] at a pressure of 55 lbs per lineal inch with the steel roller heated to a temperature of 205° F. The composite was feed through the nip at a speed of 1.5 ft/min resulting in a dwell time of 3.13 seconds. The imaged film could be removed from the liner and applied to a normal receptor substrate.

The image was protected with a clear coat that reduced smudging of the ink. (Ink without clear coat protection smears very easily). However, the image was susceptible to water. The sample had a top surface that was somewhat protected the ink.

EXAMPLE 19

Ink Jet Graphics

The following solution was prepared: 75 grams water, 5 grams Polyox™ N-3000 (available from Union Carbide) and 20 grams ethanol. The solution was coated onto a 6.7 mil polyester base film to a wet coating thickness of 5 mils (dry coating thickness of 0.1 mils).

The coated film was imaged using a HP Deskwriter 550C printer using standard HP ink cartridges. Ink receptivity of the coated film was comparable to paper. The image was transferred to Scotchcal™ 180-10 white film as described in Example 18. The transferred image was water sensitive.

EXAMPLE 20

Ink Jet Graphics

The following solution was prepared: 95 grams deionized water, 5 grams Polyox™ N-3000 (available from Union Carbide) and 2.2 grams polyurethane latex R-9000 (available from Zeneca Chemicals).

The solution was coated, image and transferred as described in Example 18. The vinyl film was precoated with a UV presize coating (what formulation, material etc.). Visual inspection indicated the image printed and transferred well. The image was more scratch resistant that the material without the urethane additive.

EXAMPLE 21

Ink Jet Graphics

The following solution was prepared: 70 grams MEK, 30 grams UCAR VYHH (commercially available from Union Carbide).

The solution was coated onto a 6.7 mil polyester base to a wet thickness of 5 mils. The dry coating thickness was 0.7 mils thick. On top of this was coated the solution as prepared in Example 19. The sample was imaged and transferred as described in Example 19. The image was no longer water sensitive and after 15 minutes water immersion, the image was unaffected (visual inspection).

EXAMPLE 22

Ink Jet Graphics

An acrylic latex dispersion (A-1052 available from Zeneca Chemicals) was coated using a notched bar with a wet gap setting of 3 mils onto an 8.0 mil cast polypropylene film and dried at 250° F. for 3 minutes resulting in a dry coating of approximately 1.0 mils.

The solution was prepared according to Example 18 was coated on top of the dried acrylic latex dispersion. The dried sheet material was imaged, transferred and tested as described in Example 18.

Visual inspection indicated an image of good quality and density was obtained. Furthermore, the image was abrasion resistant and could withstand water immersion without coming loose from the vinyl layer.

EXAMPLES 23–26 AND COMPARATIVE EXAMPLES C23–C26

Transfer Efficiency

Separate stripes of black, cyan, magenta and yellow toner distributed by 3M as Scotchprint™ Toners 8704, 8703, 8702, and 8701 respectively were electrostatically applied to Scotchprint™ Transfer Media 8601 using a 3M Scotchprint 9511 Printer.

The toner images were transferred from the originally imaged transfer sheets to graphic overlays manufactured in accordance with the procedure of Example 3 by overlapping the imaged transfer sheets and graphic overlays, with the image contacting the protective layer, and feeding the overlapped combination through heated nip rollers [one steel and one 58 Shore D hardness rubber] at a pressure of 55 lbs per lineal inch with the steel roller heated to a temperature of 205° F. The transfer sheet was then peeled from the laminate to produce the four color stripped graphics transfer article.

Toner images were transferred from a graphics transfer article to each of the receptor materials identified in Table 2 by overlapping a graphics transfer article and the receptor material, with the image contacting the receptor material, and feeding the overlapped combination through heated nip rollers [one steel and one 58 Shore D hardness rubber] at a pressure of 55 lbs per lineal inch with the steel roller heated to a temperature identified in Table 2 (Application Temp) at a rate of 1.0 feet per minute. A spacer was inserted between the roller bearing to maintain a gap of approximately the thickness of the receptor material minus 0.025 inches. This differential produces a laminating force approximately equal to using 55 lbs per lineal inch but facilitates feeding heavier material into the laminator.

For comparison purposes, toner images were also transferred directly from originally imaged transfer sheets to each of the receptor materials using the same procedure used to transfer toner images from the graphics transfer articles to the receptor materials.

The amount of toner transferred to the receptor was measured in terms of reflected optical density using a X-Rite Model 404, X-Rite, Inc, Grandville, Mich., in accordance with the manufacturers directions. The results are set forth in Tables 2A–2D. The higher the reflected optical density (ROD), the better the transfer and higher quality of image produced. The ROD of the toners on an imaged transfer sheet, that is, prior to transfer are summarized in Table 2. It should be noted that using the graphics transfer article of the present invention can enhance the ROD of the transferred toners.

The results of these samples indicate that a more efficient transfer of electrostatically applied toner to a receptor was achieved using the graphic overlay of this invention compared to direct transfer of toner from an originally imaged transfer sheet to the receptor. The results also indicate that toner transfer to the receptor was less dependent upon lamination temperature when the graphic overlay of this invention was used.

TABLE 2

Reflected Optical Density (ROD)

| Receptor Material: None<br>Color | Example Control<br>Application Material: None<br>Mean ROD |
|---|---|
| Black | 1.40 |
| Cyan | 1.34 |
| Magenta | 1.31 |
| Yellow | 0.86 |

TABLE 2A

Application Temperature: 190° F.

| Receptor Material: Polycarbonate<br>Color | Example C23<br>Application Material: Transfer Sheet<br>Mean ROD | Example 23<br>Application Material: Graphics Transfer Article<br>Mean ROD |
|---|---|---|
| Black | 0.19 | 1.58 |
| Cyan | 0.19 | 1.47 |
| Magenta | 0.21 | 1.33 |
| Yellow | 0.26 | 0.90 |

TABLE 2B

Application Temperature: 205° F.

| Receptor Material: Polycarbonate<br>Color | Example C24<br>Application Material: Transter Sheet<br>Mean ROD | Example 24<br>Application Material: Graphics Transfer Article<br>Mean ROD |
|---|---|---|
| Black | 0.48 | 1.58 |
| Cyan | 0.13 | 1.52 |
| Magenta | 0.47 | 1.32 |
| Yellow | 0.45 | 0.97 |

TABLE 2C

Application Temperature: 190° F.

| Receptor Material: Scotchcal ™ vinyl film<br>Color | Example C25<br>Application Material: Transfer Sheet<br>Mean ROD | Example 25<br>Application Material: Graphics Transfer Article<br>Mean ROD |
|---|---|---|
| Black | 1.20 | 1.60 |
| Cyan | 1.22 | 1.53 |
| Magenta | 1.18 | 1.36 |
| Yellow | 0.73 | 0.86 |

TABLE 2D

| Application Temperature: 205° F. | | |
|---|---|---|
| | Example | |
| Receptor Material: Scotchcal ™ vinyl film Color | C26 Application Material: Transfer Sheet Mean ROD | 26 Application Material: Graphics Transfer Article Mean ROD |
| Black | 1.39 | 1.75 |
| Cyan | 1.19 | 1.65 |
| Magenta | 1.30 | 1.46 |
| Yellow | 0.83 | 0.91 |

EXAMPLE 27

A graphic overlay composite was prepared by coating a premask layer of a paper having a basis weight of 94 lbs per ream (3000 sq. ft.) with high density polyethylene on both sides (13 lb. on gloss side and 11 lb. on matte side, commercially available from HP Smith) first with a layer of a composition consisting essentially of the formulation described in Table 3 and secondly with a layer of a composition described in Table 4. The first layer was coated to yield a dry coating weight of 4.5 grams/sq. meter. The second layer was coated to yield a dry coating weight of 10.3 grams/sq. meter.

TABLE 3

| Amount Used (lbs.) | Component |
|---|---|
| 19.5 | Acryloid A-11 |
| 60.0 | MEK |
| 4.9 | VAGH |
| 13.4 | Uniflex 312 |

wherein the Acryloid A-11 is a methyl methacrylate copolymer commercially available from Rohm & Haas, VAGH is a hydroxyl (2.3%) functional vinyl chloride (90%)/vinyl acetate (4%) terpolymer commercially available from Union Carbide under the trade designation "UCAR VAGH," and Uniflex 312 is a plasticizer commercially available from Union Camp.

TABLE 4

| Amount Used (lbs.) | Component |
|---|---|
| 10.0 | VYES |
| 42.7 | MEK |
| 38.3 | toluene |
| 3.3 | Hydrin CG ™ 70 rubber |
| 6.1 | Palatinol 711-P |

wherein VYES is hydroxyl (3%) functional vinyl chloride (67%)/vinyl acetate (11%) terpolymer commerically available from Union Carbide under the trade designation "UCAR VYES," Hydrin CG™ 70 rubber is a solution epichlorohydrin solution rubber commerically available from Zeon Chemicals; and Palatinol 711-P is a C7–11 phthalate ester plasticizer commerically available from BASF.

An imaged receptor was prepared by blending the components in the amounts summarizied in Table 5. This blend was then coated onto a pressure sensitive adhesive film consisting essentially of titanium dioxide, Miles Bayhydrol™ 123, and Zeneca Chemicals R-9000 in proportions of 33/45/22. The coating weight of the receptor layer was 19.4 grams/sq. meter.

TABLE 5

| Amount Used (lbs.) | Component |
|---|---|
| 5.02 | VYHH |
| 12.56 | VYNC |
| 4.28 | Rohm & Haas B-44 |
| 52.75 | MEK |
| 10.32 | toluene |
| 4.70 | Hydrin CG ™ 70 rubber |
| 10.37 | Palatinol 711-P |

wherein the Acryloid B-44 is a methyl methacrylate polymer commercially available from Rohm & Haas, VYHH is a vinyl chloride (86%)/vinyl acetate (14%) terpolymer commercially available from Union Carbide under the trade designation "UCAR VYHH," VYNC is a vinyl chloride (60%)/vinyl acetate (32%) terpolymer commerically available from Union Carbide under the trade designation "UCAR VYNC" supplied in a 40% solids in isopropyl acetate, Hydrin CG™ 70 rubber is a solution epichlorohydrin solution rubber commerically available from Zeon Chemicals; and Palatinol 711-P is a C7–11 phthalate ester plasticizer commerically available from BASF.

The imaged receptor was placed in contact with the graphic overlay composite and passed through a hot roll laminator operated as follows: one 9" steel roll, one 9" rubber roll with a 58 Shore D hardness, with a nip pressure of 55 pounds per lineal inch, and with a speed of 46 centimeters per minutes. The resulting composite was adhered to a flexible polyvinyl coated fabric by (1) removing the liner protecting the pressure sensitive adhesive, (2) placing the adhesive in contact with the polyvinyl coated fabric, (3) adhering the graphic to the flexible polyvinyl coated fabric by pressing the pressure sensitive adhesive firmly against the polyvinyl coated fabric, and (4) removing the premask backing thus leaving the finished graphic with a clear coating on the flexible polyvinyl coated fabric.

Various modification and alterations of this invention will become apparent to those skilled in the art without departing from the scope and spirit of this invention, and it should be understood that this invention is not to be unduly limited to the illustrative embodiments set forth herein above.

What is claimed:

1. An imaged composite comprising:

(A) a receptor selected from the group consisting of acrylic, polycarbonate, vinyl and metal, and (B) a graphics transfer article laminated to the receptor, wherein the graphics transfer article comprises:

(1) a protective layer having an innermost surface and an outermost surface, (2) a premask layer laminated to the outermost surface of the protective layer, and (3) an adhesive layer having an innermost surface and an outermost surface with the outermost surface of the adhesive layer laminated to the innermost surface of the protective layer and the innermost surface of the adhesive layer laminated to the receptor, wherein:

(a) the protective layer is a hard coat component, (b) the premask layer has an elastic modulus as measured by ASTM D882 of between 10,000 and 2,000,000 psi, (c) the bond strength between the premask layer and the protective layer is between about 50 to 700 grams/inch width as measured by ASTM D-1000, and (d) the relative bond strength between (i) the protective layer and the premask layer of the graphic overlay composite, and (ii) the adhesive layer and the receptor, are such that the protective layer remains intact and bonded to the receptor upon delamination of the premask from the composite, under ambient conditions, and (C) an image positioned between the receptor and the protective layer.

2. The imaged composite of claim 1 wherein the image is an electrostatically applied image.

3. The imaged composite of claim 1 wherein the image is an inkjet image.

4. An imaged composite comprising:

(A) a receptor selected from the group consisting of acrylic, polycarbonate, vinyl and metal, and (B) a graphics transfer article laminated to the receptor, wherein the graphics transfer article consists essentially of:

(1) a protective layer having an innermost surface and an outermost surface, and (2) a premask layer laminated to the outermost surface of the protective layer, wherein:

(a) the protective layer is a thermoplastic which forms a hard, non-tacky, solid film under ambient conditions and has a softening point of about 110° to about 240° F., (b) the premask layer has an elastic modulus as measured by ASTM D882 of between 10,000 and 2,000,000 psi, (c) the bond strength between the premask layer and the protective layer is between about 50 to 700 grams/inch width as measured by ASTM D-1000, and (d) the relative bond strength between (i) the protective layer and the premask layer of the graphic overlay composite, and (ii) the protective layer and the receptor, are such that the protective layer remains intact and bonded to the receptor upon delamination of the premask from the composite, under ambient conditions, and (C) an image positioned between the receptor and the protective layer.

5. The imaged composite of claim 4 wherein the image is an electrostatically applied image.

6. The imaged composite of claim 4 wherein the image is an inkjet image.

* * * * *